Sept. 16, 1958 N. F. HAWTHORNE 2,852,192
CARRIAGE SHIFT CONTROLLING MECHANISM
Filed Dec. 20, 1954 8 Sheets-Sheet 1

FIG.2

United States Patent Office 2,852,192
Patented Sept. 16, 1958

2,852,192

CARRIAGE SHIFT CONTROLLING MECHANISM

Nathaniel F. Hawthorne, Alameda, Calif., assignor to Friden, Inc., a corporation of California Application December 20, 1954, Serial No. 476,349

8 Claims. (Cl. 235—63)

This invention relates to calculating machines and is concerned more particularly with a provision of improved means for effecting shifting movement of the shiftable register carriage of calculating machines.

It is an object of the invention to provide an improved shift mechanism having a smooth and even action during a shifting operation of the register carriage of calculating machines.

Another object of the invention is to provide a shifting mechanism of a silent character, and particularly one wherein the centralizing means is rendered ineffective for each ordinal shift of the register carriage during plural order shifting operations.

Another object of the invention is to provide an improved shifting mechanism of the character referred to, and specifically one in which the shift centralizer is automatically rendered ineffective.

A further object of the invention is to provide an improved shifting mechanism of the character referred to, and especially one in which the selected shift clutch is disengaged in the full-cycle position thereof and the shift centralizer is enabled in any selected ordinal position of the register carriage.

Another object of the invention is to provide an improved shifting mechanism for moving a register carriage selectively in either direction with the engagement of a selected clutch subsequent to the initiation of the shifting operation.

Another object of the invention is to provide an improved shifting mechanism for a register carriage wherein the carriage is effective, upon movement into either extreme end position thereof, to terminate the operation of the shift mechanism and to render the centralizing means effective.

Other objects and advantages of the invention will be apparent from the following description of certain preferred embodiments thereof, as illustrated in the accompanying drawings, in which:

Figure 1:
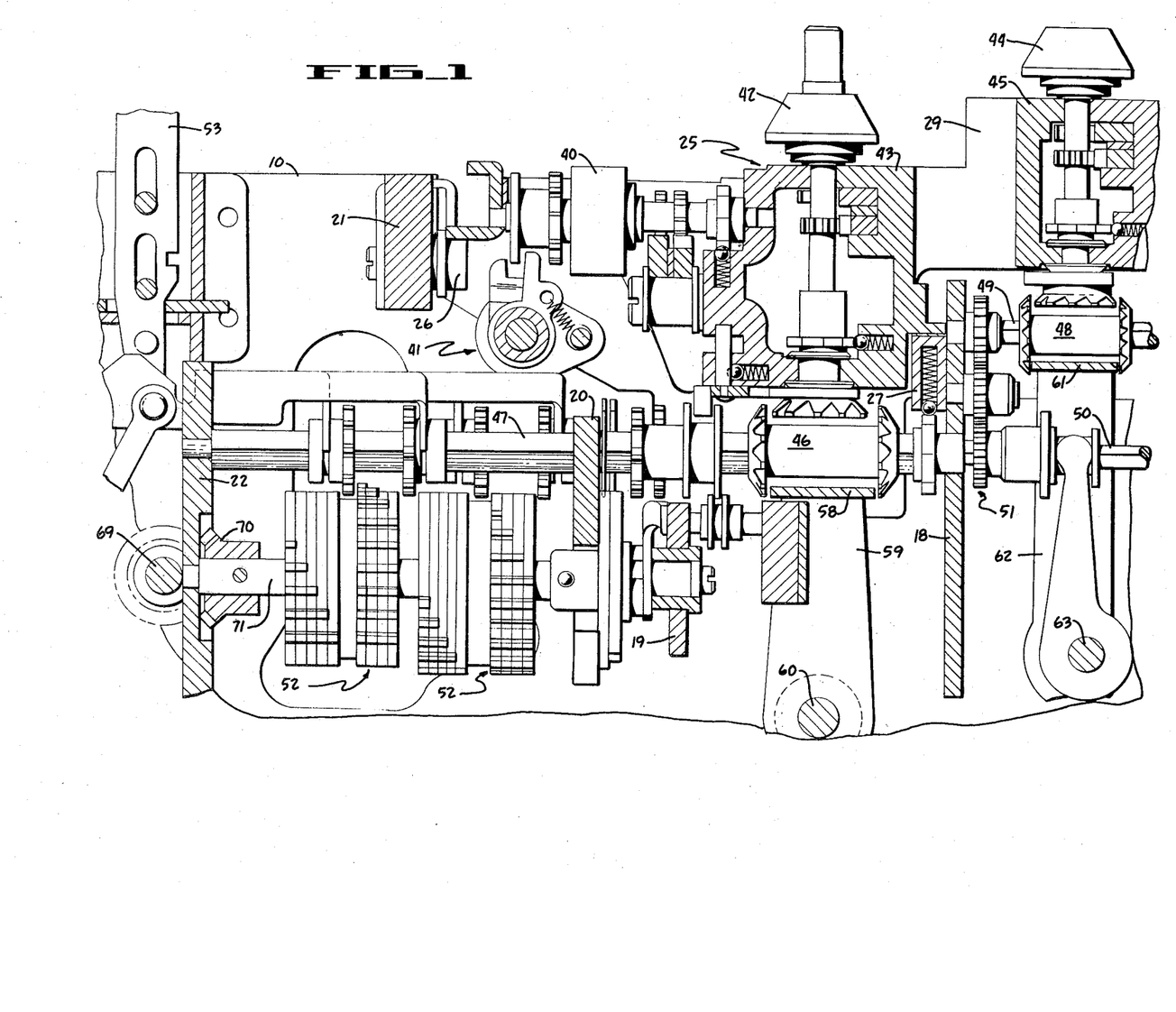
Fig. 1 is a fragmentary sectional elevational view of the rear portion of the machine taken on a longitudinal plane.

The calculating machine selected for illustration in connection with the invention is basically of the general type, described in the patent to Carl M. F. Friden, No. 2,229,889, dated January 28, 1941. The machine shown is provided, however, with a duplex register, only a brief description of which will be given, since it forms no pertinent part of the invention. The machine also includes a base (not shown) upon which side frame members 10, 11 and auxiliary frame member 12 (Figs. 1, 2 and 3) of the frame construction are mounted. The frame of the machine also includes transverse brackets 16, 17, 18, 19, 20, 21 and 22 (Figs. 1, 4 and 5) which extend between the side plates 10 and 11 and are secured thereto in any convenient manner.

The machine includes a shiftable register carriage, indicated generally at 25 (Figs. 1, 3, 4 and 5) which is mounted for endwise sliding movement on frame bracket 21 by means of rollers 26, intermediate its width on a transverse bar 27 secured to bracket 18, and at the rear by means of a shaft 28 secured at its ends to each of similar carriage end frames 29. Shaft 28 is supported for sliding movement in a bushing 30 mounted in side frame member 11, and in a bushing 31 mounted in the vertical portion 32 of a bracket 33 which is secured to rear transverse bracket 16 by any suitable means such as screws 34. A horizontal portion 35, formed at right angles to the vertical portion 32, is secured to a bracket 36 mounted on side frame member 10 to accurately maintain coaxial alignment of bushing 31 and shaft 28. The duplex register carriage 25 serves to mount the numeral wheels 40 of the revolutions counter having an actuator 41 of suitable construction associated therewith. The carriage 25 also mounts numeral wheels 42 of one accumulator, which are suitably journalled in carriage frame 43, and numeral wheels 44 of the second accumulator, which are suitably journalled in carriage frame 45. Numeral wheels 42 are adapted for actuation through suitable plus-minus gearing 46 having a sliding driving engagement with square shafts 47. Likewise, numeral wheels 44 are adapted for actuation through similar plus-minus gearing 48, having a sliding driving engagement with square shafts 49 driven through gearing 51, in cyclic relation to square shafts 47, from square shafts 50 having a driving engagement with shafts 47. Each shaft 47 receives differential increments of movement in a known manner, from the associated actuating cylinders 52 under control of the usual banks of numeral keys 53 associated therewith. The sign character of the registration in the first accumulator is controlled by shifting of the plus-minus gearing 46 under the control of a gate 58, which is mounted by suitable upright arms 59 on a transverse rockable shaft 60. The sign character of the registration in the second accumulator may be controlled simultaneously with, or independent of, the first register by similar shifting of the plus-minus gearing 48 under the control of gate 61, which is mounted on suitable upright arms 62 secured on transverse rockable shaft 63. Each of the sign character control mechanisms may be controlled in any convenient manner for the performance of calculating operations.

The drive for the actuating cylinders 52 and for all other power driven operations of the machine, is derived from a motor (not shown) having its drive shaft connected by suitable gearing including a driving gear 67 (Fig. 2) to which is secured the ratchet 68 of a cyclically operable clutch. Driving gear 67 and ratchet 68 are journalled on driven shaft 69, which is suitably connected by bevel gearing 70 (Fig. 1) to actuator shafts 71. The cyclic operation of the clutch is controlled by means of clutch pawl 72 carried by driven member 73 of the clutch secured on drive shaft 69, said pawl 72 being urged by spring 74 into clutch-engaging position with respect to ratchet 68.

Engagement of the clutch is controlled by means of clutch control lever 75, which is held by screw 76 for rocking movement on boss 77 secured on side frame member 11. Control lever 75 is connected by link 78 with lever 79 pivotally mounted at 80 on side frame member 11, which lever 79 is pivotally connected at its lower end with link 81 to control the opening and closing of the motor switch in a conventional manner.

Shift mechanism

Means are provided for shifting the carriage selectively in either direction for one or more ordinal steps of movement, and the shifting means is preferably operated from one of the actuating shafts 71 and the cyclically operable clutch under the control of a pair of manually depressible, freely retractable shift keys, which control shifting of the carriage for one or more steps of movement in accordance with the length of time (the number of machine cycles) they are maintained depressed.

Figure 2:
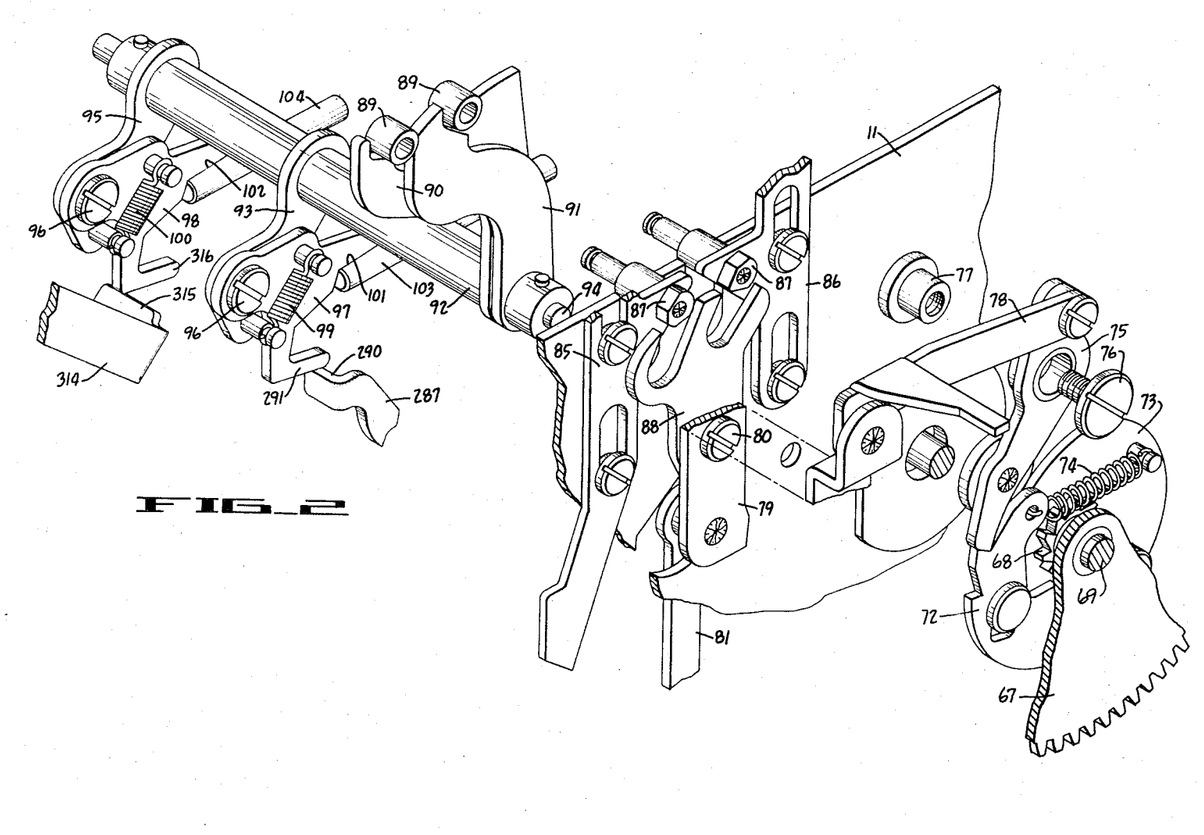
Fig. 2 is a projection viewed from the right side of the machine, showing the shift control mechanism and the cyclic driving clutch.

Referring to Fig. 2, the shift control keys are indicated at 85 and 86 and are mounted for vertical sliding movement on the side frame member 11 by suitable pin-and-slot connections. Suitable spring means (not shown) may be provided for maintaining keys 85 and 86 in their raised positions, as shown in Fig. 2. Each key 85 and 86 is provided with a pin 87 which projects to either side of the key. One end of each pin 87 cooperates with a suitable cam surface on a claw arm 88 secured to lever 79 for rocking movement therewith. Therefore, upon depression of either shift key 85 or 86, lever 79 is rocked and links 78 and 81 become effective respectively to engage the clutch and close the motor switch.

Figure 4:
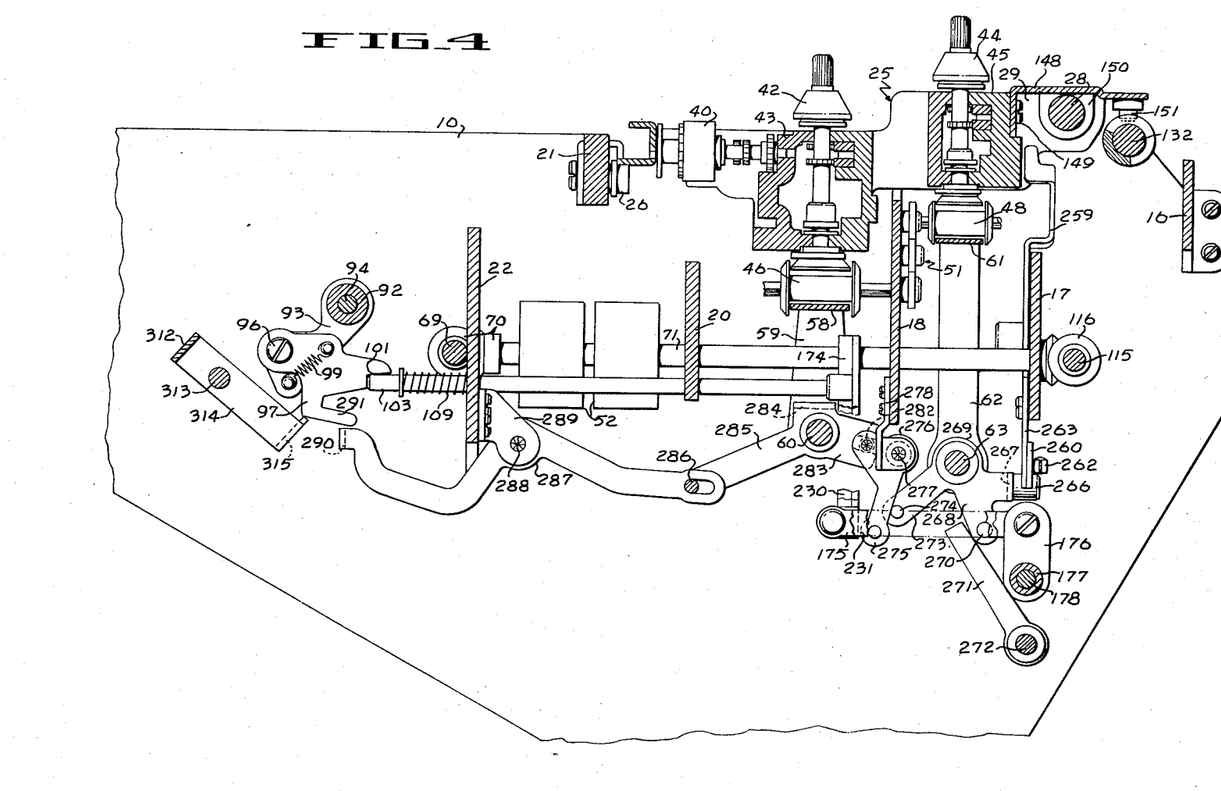
Fig. 4 is a fragmentary sectional elevational view of the machine showing the right shift control mechanism, including the initiating means and the disabling means therefor, taken along the plane indicated by the line 4—4 on Fig. 3.
Figure 5:
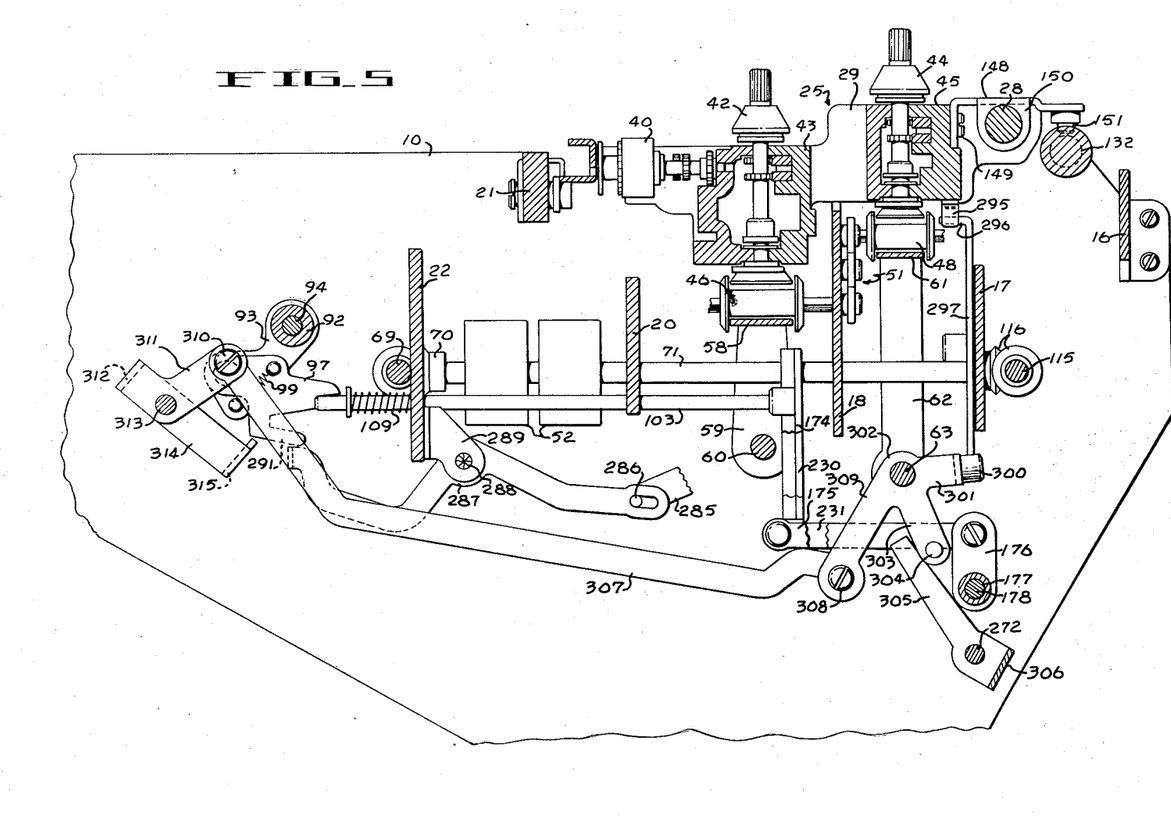
Fig. 5 is another fragmentary elevational view of the rear portion of the machine showing the shift control mechanisms, including the right shift initiating means and the left shift disabling means, taken from a plane to the right of that of Fig. 4, as indicated by the line 5—5 on Fig. 3.

Prior to the engagement of the clutch and closing of the motor switch, each of keys 85, 86 is operative to engage corresponding shift control clutches, so that selective shifting movement of the carriage 25, in either direction and for one or more ordinal positions, is determined by depression and release of the respective keys. As seen in Fig. 2, the respective left-hand ends of pins 87 on keys 85 and 86, carry rollers 89 operatively related to right shift control arm 90 and left shift control arm 91, respectively. Arm 90 is secured to one end of a sleeve 92, the other end of which carries arm 93, while arm 91 is secured to one end of shaft 94 on which sleeve 92 is pivotally mounted. Intermediate its ends, shaft 94 carries a depending arm 95 pinned thereto. Arms 93 and 95 have pins 96 thereon, on which respective pusher links 97 and 98 are pivotally mounted. Springs 99 and 100 urge respective pusher links 97, 98 in a clockwise direction to maintain their notched ends 101, 102 in operative engagement with respective push rods 103 and 104, which are slidably mounted for endwise movement in the transverse brackets 20 and 22, as seen in Figs. 4 and 5, and normally urged to an inactive position by similar springs 109. Thus, depression of the right shift key 85 through arm 90, sleeve 92 and arm 93, causes pusher link 97 to move the push rod 103 rearwardly. Depression of the left shift key 86 through arm 91 rocks shaft 94 and arm 95 counter-clockwise, which, through pusher link 98, moves push rod 104 rearwardly in a similar manner.

The respective push rods 103, 104 serve, upon depression of the respective keys 85 and 86, to enable the drive connection from an extended actuator shaft 71 through respective right or left shift clutches 110, 112 (Figs. 6 and 7) to the shifting mechanism, in a manner to be described.

Figure 3:
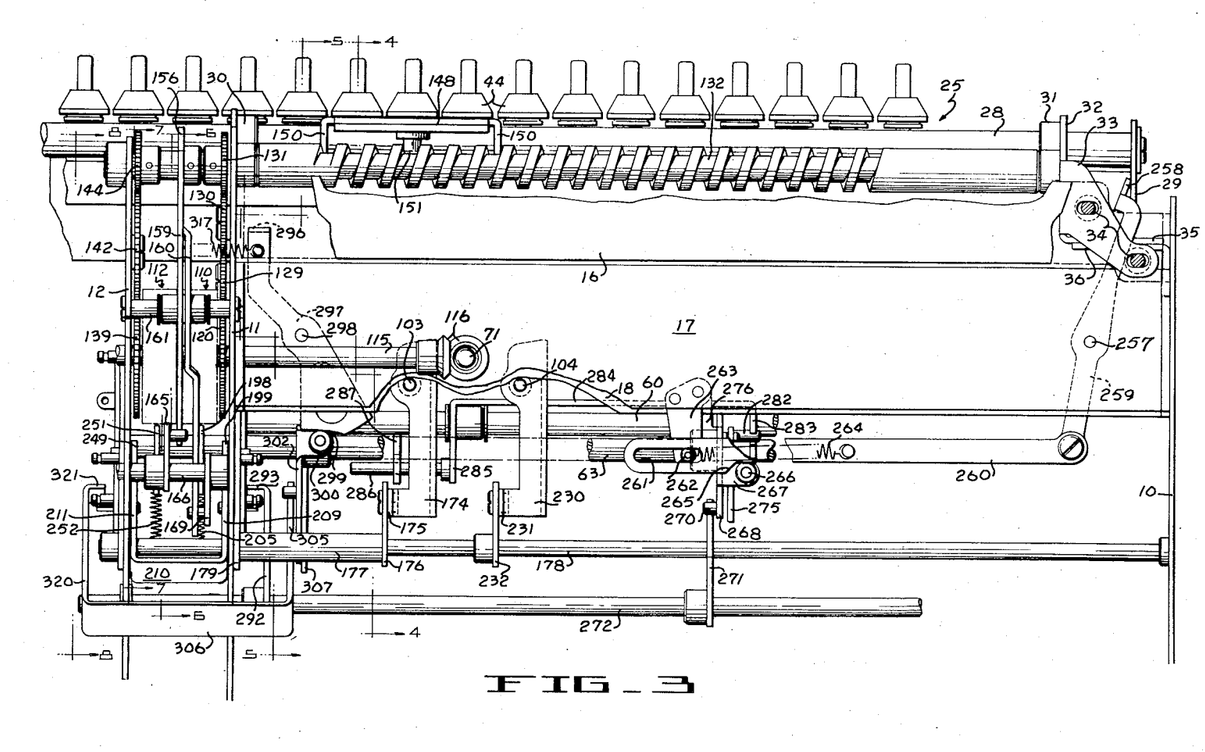
Fig. 3 is a rear elevational view of the machine.
Figure 6:
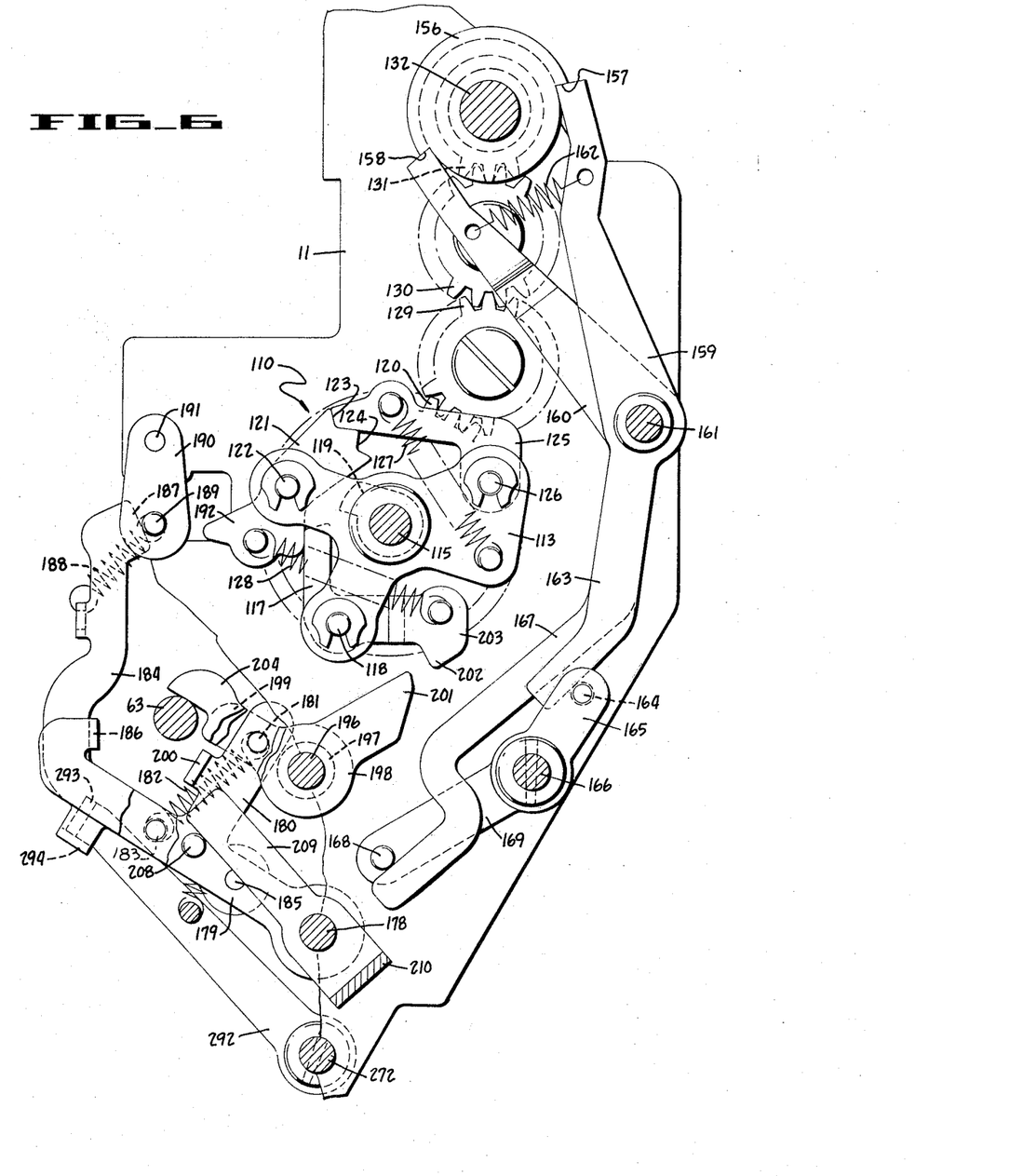
Fig. 6 is a sectional elevational view of the right shift clutch, the controls therefor, and the shift centralizing mechanism, the view being taken on the plane indicated by line 6—6 of Fig. 3.
Figure 7:
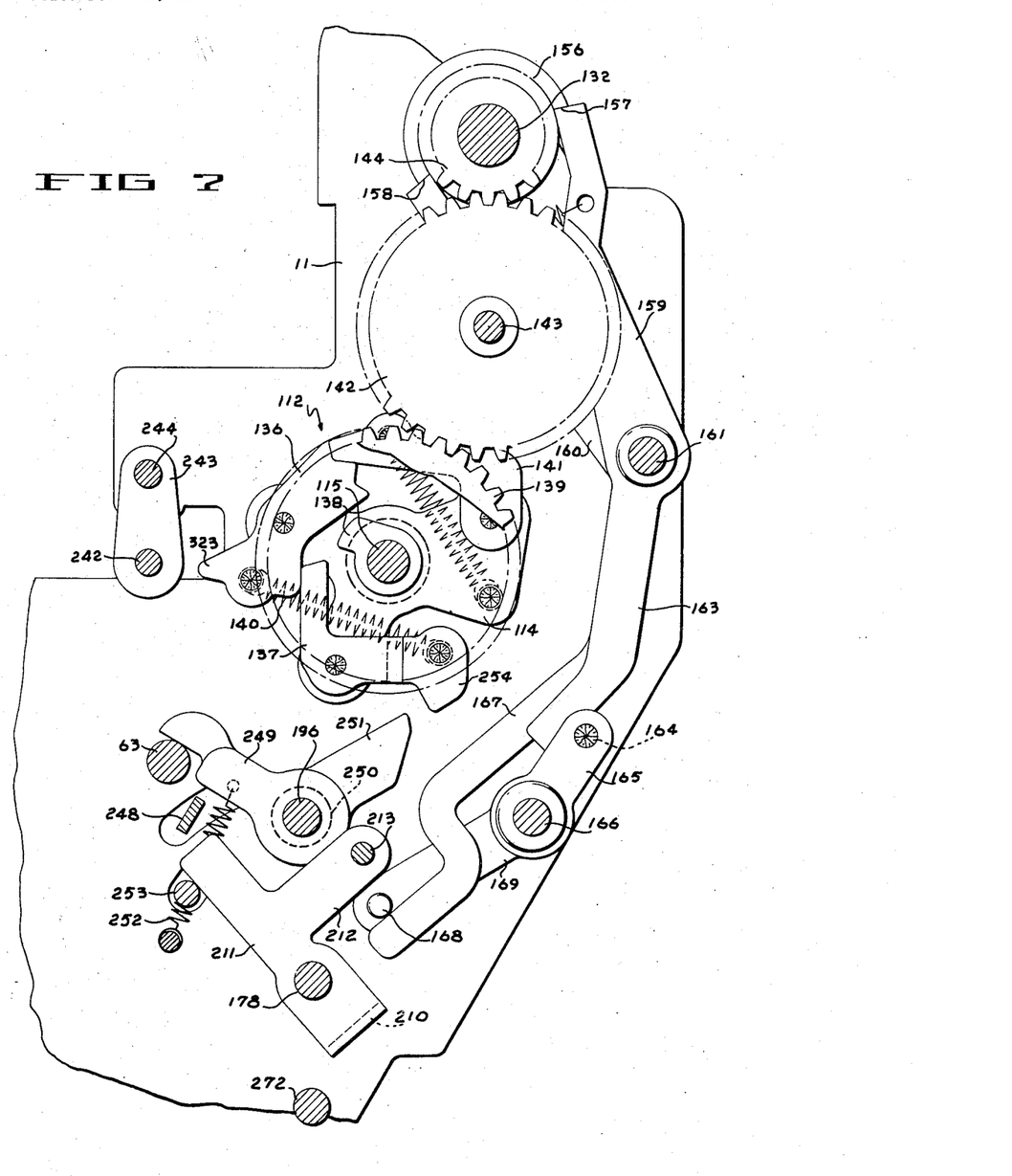
Fig. 7 is an enlarged sectional elevational view of the left shift clutch mechanism, taken on the plane indicated by line 7—7 of Fig. 3.

Each cyclic operation of the clutch member 73 (Fig. 2) becomes effective, upon engagement of either clutch 110 or 112 (Figs. 6 and 7), to shift the accumulator carriage 25 one ordinal space to the right or left, as viewed from the front of the machine. Since the elements in each of clutches 110 and 112 are identical as to structure and operation, it is believed that a detailed description of clutch 110 will suffice for both. Referring to Figs. 3, 6 and 7, the driving members 113 and 114 of the respective clutches 110 and 112 are adjacently secured on a shaft 115 journalled in frame members 11 and 12 and a bearing collar secured on transverse bracket 17. Cyclic rotation is imparted to shaft 115 through extended actuator shaft 71 and miter gearing 116, which shaft 71 is journalled in transverse brackets 17, 18, 20 and 22. Driving member 113 is comprised of three arms, to one of which a bellcrank 117 is pivotally mounted at 118, the clockwise rocking movement of which (Fig. 6) positions the upper extremity of the vertically extended arm thereof into position for engagement with a dog 119 secured to a 32-tooth gear 120 for rotational control thereof. To operatively position the vertical arm of the bellcrank 117 relative to the dog 119, a lever 121 is provided, pivotally mounted at 122 on a second arm of the driving member 113. At its upper extremity, one arm of lever 121 is provided with notches 123 and 124, either of which is engageable by a detent arm 125 pivoted at 126 on the third arm of driving member 113. Detent arm 125 is effective, in cooperation with notch 123 or 124 under the urgency of a spring 127 secured at its one end to a pin on the arm 125 and at its other end to a pin on the third arm of member 113, to resiliently maintain lever 121 in the inoperative position shown or the operative counter-clockwise rocked position thereof. Lever 121 and the vertical extension of bellcrank 117 are maintained in engagement, one with the other, by a spring 128 supported at its ends by a pin on a lower portion of lever 121 and a pin on a horizontal arm of bellcrank 117.

Driven gear 120 and dog 119 secured thereto are rotatable on shaft 115 and become operable, upon clockwise rocking of bellcrank 117 through 16-tooth idler gears 129, 130 rotatably mounted on frame member 11, to impart rotation to a 16-tooth gear 131, which is secured on one end of the worm shift shaft 132 suitably journalled at its one end in frame members 11 and 12, and at its other end in bracket 32. Thus, it can be seen that with each clockwise rotation of clutch 110 and therefore 32-tooth gear 120 (Fig. 6), gears 129, 130 and 131 will be effective to impart bicyclic rotation to shaft 132 in a counter-clockwise direction.

To effect an opposite, or clockwise, directional rotation of shaft 132, a lever 136 (Fig. 7), pivotally mounted on one arm of driving member 114 of clutch 112, is rocked counter-clockwise, as viewed in Fig. 7, to rock the end of the vertically extended portion of a bellcrank 137 clockwise about its pivot on a second arm of the driving member 114 for engagement with a dog 138 secured to a driven 32-tooth gear 139, which is rotatably mounted on shaft 115. The lower extended portion of lever 136 and the vertical arm of bellcrank 137 are resiliently maintained in engagement, one with the other, by a spring 140. Lever 136 is yieldably held in either of its two positions by a spring-urged detent pawl 141 pivotally mounted on a third arm of driving member 114. Driven gear 139 is enmeshed with a 32-tooth gear 142 mounted for rotation at 143 on frame member 12, which gear is, in turn, enmeshed with a 16-tooth gear 144 secured on worm shaft 132. Thus, it is readily apparent that upon each clockwise rotation of clutch 112 and therefore gear 139, shaft 132 is given two complete cycles of rotation. Following each shifting operation, whether it be a single ordinal shift of the carriage 25 or a multiple ordinal shift of the carriage, and upon disengagement of the cyclically operable clutch 73 (Fig. 2), the operative clutch 110 or 112 is also disengaged in the full-cycle position thereof by means to be hereinafter described.

Shifting of the accumulator carriage 25 to the right, or to the left, is controlled by the rotation of the worm shaft 132 in one direction or the other. Carriage 25 (Figs. 3, 4 and 5) carries a bracket 148 secured thereto by any suitable means such as screws 149. Flanges 150 are formed at a right angle to either end of bracket 148 to embrace supporting shaft 28 for sliding movement thereon. At its outer extremity, bracket 148 carries a pin 151 depending therefrom for engagement with the thread of the shaft 132, the helical angle of the threads of the worm shaft being such, that for each rotation of the worm shaft, the carriage is moved to the right or left one-half an ordinal step. Thus, it can be seen that upon each cycle of clockwise rotation of right shift clutch 110 (Fig. 6), shaft 132 is given two full counter-clockwise rotations, thereby shifting the accumulator carriage 25 one ordinal step to the right, as viewed from the front of the machine. Similarly, each clockwise cyclic rotation of clutch 112 (Fig. 7) imparts two clockwise rotations to shaft 132, thereby shifting the carriage one ordinal step to the left.

Means are provided for positively centralizing worm shaft 132 in each ordinally shifted position of the accumulator carriage 25 to effect accurate alignment of the register dials 42, 44 with the ordinal rows of keys in the keyboard of the machine. The centralizing means also becomes effective, upon disengagement of either operated clutch 110 or 112 in any ordinally shifted position of the carriage, to properly position the respective dogs 119 and 138 for a subsequent engagement by the vertically extended arms of bellcranks 117 and 137 after 15 degrees of clockwise rotation of the driving members 113 and 114 from the full-cycle position thereof, shown in Figs. 6 and 7. Referring to Figs. 3, 6 and 7, a centralizer disk 156 having opposed shoulders 157, 158 thereon is secured to shaft 132 intermediate the gears 131, 144. In the ordinally aligned position of the register dials with respect to the keyboard of the machine, and upon disengagement of either clutch 110 or 112, the extremities of the respective upwardly extended arms of levers 159 and 160, which are adjacently mounted for rocking movement in opposite directions on a shaft 161 supported between frame members 11 and 12, are urged by a spring 162 into engagement with the respective shoulders 157, 158 of the disk 156. To render the levers ineffective with respect to centralizer disk 156, a depending arm 163 of lever 159 overlies a pin 164 on an arm 165 secured to a shaft 166 journalled in frame members 11 and 12, while a depending arm 167 of lever 160 is formed at its lower end to underlie a pin 168 on an arm 169, also secured to shaft 166. Thus, it can be seen that upon counter-clockwise rocking movement of shaft 166, levers 159 and 160 are rocked clockwise and counter-clockwise, respectively, against the urgency of spring 162 to move the upper extreme ends thereof out of engagement with the respective shoulders 157, 158 of disk 156.

The selective engagement of clutch 110 or 112 is effected in the following manner: Upon depression of shift key 85 (Fig. 2) arm 90 is rocked to move push rod 103 rearwardly of the machine. Rod 103, at the rearward end thereof, carries a depending angle-shaped member 174 (Figs. 3, 4 and 5), at the lower end of which one end of a link 175 is pivoted, the other end of which is pivoted on an arm 176 secured to one end of a sleeve 177 rotatably mounted on a shaft 178. At its other end, sleeve 177 carries an arm 179 (Fig. 6) having a finger 180 extending perpendicular thereto. Near its end, finger 180 carries a pin 181 supporting one end of a spring 182, the other end of which is secured on a pin 183 on an L-shaped arm 184 pivotally mounted at 185 on arm 179. Spring 182 normally urges arm 184 into engagement with an ear 186 formed at right angles to the free end of arm 179. The free end of arm 184 is provided with an inclined cam surface 187 which, under the urgency of a spring 188, is maintained in engagement with a pin 189 extending to either side of an arm 190 pivotally mounted at 191 on frame member 11. Consequently, as push rod 103 and therefore depending arm 174 are moved rearwardly of the machine, arms 176 and 179 are rocked clockwise (Figs. 4 and 6) to effect a rocking movement of arm 184 through spring 182, imparting a counter-clockwise movement to arm 190. The rocking arm 190 moves one extension of pin 189 into the rotational path of a cam nose 192 formed on the lower end of lever 121, so that immediately upon clockwise rotation of the driving member 113, nose 192 engages pin 189, camming lever 121 to its counter-clockwise detented postion, thereby rocking bellcrank 117 into position for engagement with the dog 119 on the driven gear 120.

Means are provided and normally positioned to effect disengagement of clutch 110 in the full-cycle position thereof. To render the disengaging means ineffective during the operation of the clutch, a shaft 196 is provided, secured at its ends in frame members 11 and 12 and pivotally supporting a sleeve 197 (Fig. 6), to one end of which is secured a bellcrank 198, and the other end of which carries an arm 199 overlying an ear 200 formed at right angles to finger 180 of arm 179, and extending through the arcuate aperture in frame member 11. Sleeve 197 is positioned laterally on shaft 196 in a manner such that an arm 201 of bellcrank 198 is vertically aligned with a V-nose 202 on a horizontal arm 203 of bellcrank 117. A notched end of the other arm 204 of bellcrank 198 is normally urged against shaft 63 by a spring 205 (Fig. 3) similar to spring 252 (Fig. 7), in which position arm 201 is effective for engagement by the nose 202 in the clutch-engaging position of bellcrank 117. Upon depression of shift key 85 (Fig. 2) and the rocking thereby of arm 179 (Fig. 6) to effect engagement of clutch 110, ear 200 on finger 180 engages arm 199 to rock bellcrank 198 clockwise, moving the end of arm 201 out of the rotational plane of the nose 202 of bellcrank 117, which is rocked clockwise immediately upon rotation of driving member 113 from the full-cycle position shown in Fig. 6.

Figure 8:
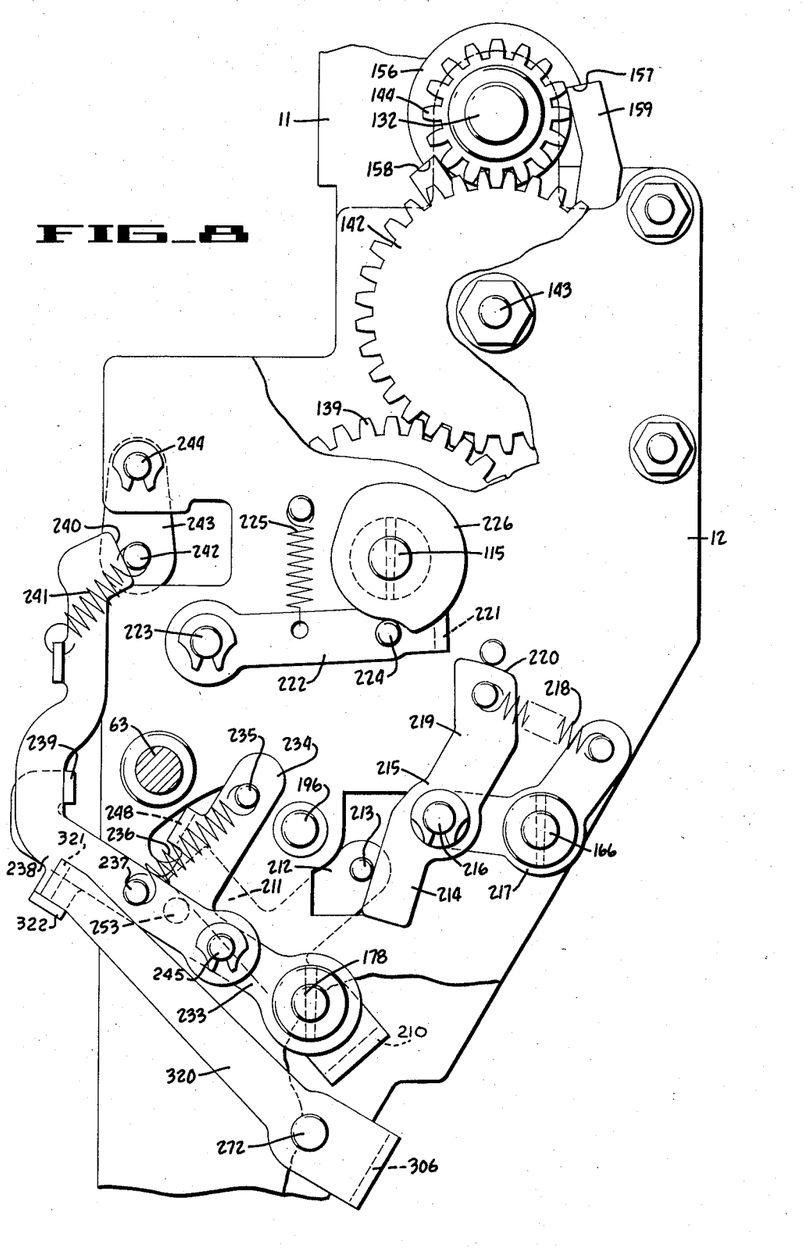
Fig. 8 is a fragmentary elevational view of the rear portion of the machine, showing the left shift clutch controls and the centralizer release control means, the view being taken on the plane indicated by line 8—8 of Fig. 3.

Upon depression of shift key 85, and in the first 15 degrees of rotation of shaft 115 and therefore driving member 113 (Fig. 6), the centralizing means is rendered ineffective, thereby enabling counter-clockwise rotation of shaft 132. Referring to Figs. 3, 6 and 8, arm 179 carries a pin 208 underlying the free end of one arm 209 of a bail 210 rockably mounted on shaft 178. The other arm 211 of the bail is provided with an upwardly extended portion 212, which carries a pin 213 operatively related to a depending arm 214 of a lever 215 pivotally mounted at 216 on one arm of a bellcrank 217 secured on shaft 166. A spring 218, supported at its one end by a pin on the second arm of bellcrank 217 and at its other end by a pin near the upper extremity of an arm 219 of lever 215, serves to resiliently maintain the depending arm 214 in engagement with pin 213. To rock the ends of levers 159, 160 out of blocking relation with the respective shoulders 157, 158 of the centralizer disk 156, clockwise rocking of arm 179 (Fig. 6) rocks arm 209, and therefore arm 211, clockwise (Fig. 8) to position the accuate end 220 of arm 219 beneath an ear 221 formed at right angles to an arm 222 pivotally mounted at 223 on frame member 12. A pin 224 on arm 222 is urged by a spring 225 into engagement with a cam 226 secured on shaft 115. Cam 226, therefore, becomes effective immediately upon depression of shift key 85 and the counter-clockwise rocking of lever 215 to cam arm 222 downwardly, thereby rocking shaft 166 and arms 165, 169 (Fig. 6) in a counter-clockwise direction to rock arms 159 and 160 clockwise and counter-clockwise, respectively, against the urgency of spring 162, thereby releasing shift shaft 132 for rotation subsequent to the initial 15 degrees of rotation of driving member 113.

Referring to Figs. 2, 3, 5, 7 and 8, to effect ordinal shifting of the carriage 25 to the left, as viewed from the front of the machine, a depression of shift key 86 rocks arm 91, shaft 94, and arm 95 counter-clockwise to move push rod 104 rearwardly of the machine. Push rod 104 carries at its rearward end a depending member 230 having the form of an angle which, at its lower end, is provided with an ear on which one end of a link 231 is pivotally mounted, the other end of which is pivoted on an arm 232 secured on shaft 178. The engagement of the left shift clutch 112 is effected in a manner similar to that of right shift clutch 110. That is, a depression of the key 86, rocks shaft 178 clockwise as viewed in Fig. 8, to rock an arm 233 secured to one end thereof, which arm is provided with an upwardly extending portion 234 having a pin 235 thereon which serves to carry one end of a spring 236. At its other end, spring 236 is secured on a pin 237 on an L-shaped arm 238 pivoted at 245 on arm 233, which spring serves to resiliently maintain arm 238 in engagement with an ear 239 formed at right angles to the free end of arm 233. The end of the vertically disposed extension of arm 238 is provided with an inclined cam surface 240, which is resiliently maintained by a spring 241 in operative engagement with one extension of a doubly extended pin 242 on the lower end of an arm 243 mounted for rocking movement on a stud 244 of frame member 12. Clockwise rocking of shaft 178 and arm 233 (Fig. 8) serves, through spring 236 and arm 238, to rock the other extension of pin 242 into the rotational plane of the cam nose 323 of lever 136. An ear 248, formed at right angles to vertical portion 234 of arm 233, extends through an arcuate slot in frame member 12 to a position underlying an arm 249 secured to one end of a sleeve 250 rockably mounted on shaft 196. At its other end, sleeve 250 carries a bellcrank 251 having an angularly disposed arm operable for movement by arm 233 out of rotational alignment with the nose 254 of clutch-engaging bellcrank 137 against the urgency of a spring 252, thereby rendering bellcrank 251 ineffective to disengage clutch 112 until the termination of the shifting operation.

Rocking of the shaft 178 and arm 233 also serves, through a pin 253 underlying arm 211 of bail 210, to rock the arcuate end surface 220 of lever 215 into an operative position relative to ear 221 on arm 222, whereby clockwise rotation of cam 226 rocks bellcrank 217 and shaft 166 counter-clockwise to release levers 159, 160 from their engagement with centralizer disk 156.

Upon release of either key 85 or 86 during any part of a shift cycle, similar springs 109 on push rods 103 or 104 (Figs. 4 or 5) operate to restore the respective push rod to its inoperative position. The restoration of push rod 103 rocks arm 176 (Figs. 3, 4 and 6) counterclockwise to restore arms 179, 184 to their inactive position, thereby enabling spring 205 to rock bellcrank 198 counter-clockwise, moving the nose of arm 201 into position for engagement by the V-nose 202 of clutch-engaging bellcrank 117 to rock lever 121 to the inoperative detented position shown in Fig. 6. Thus, the shifting mechanism is returned to its inoperative, or normal, position at the end of a cycle in which the carriage shift key is released. It is also necessary to operate the centralizing arms 159, 160 so as to stop the shaft 132 in the proper position at the end of the cycle, without any danger of overthrow. It is therefore necessary to condition the centralizing arms 159, 160 for operation before the end of each cycle, and in fact this is done at approximately the halfway point of each cycle of a shifting operation. Immediately following a 180° rotation of cam 226 (Fig. 8), spring 225 lifts arm 222, thereby releasing lever 215, bellcrank 217 and shaft 166 to the force of spring 162. Spring 162 thus becomes effective to urge levers 159 and 160 into position for engagement with respective shoulders 157, 158 of the centralizer disk 156 upon completion of the cyclic rotation of clutch 110. The arms 159, 160 obviously ride on the periphery of the disk 156 and will engage their respective shoulders at the full-cycle position, in which position the carriage is accurately positioned in an ordinal position. At this point in the cycle the arm 215 may or may not be released to the force of its spring 218, depending upon whether the shift key has been released to return arm 179 and consequently bail 210 to its inactive position. If the shift key is held depressed and the carriage is shifted through several ordinal steps, the centralizing arms 159 will be operated to engage the periphery of the disk 156 about the midpoint of each cycle of operation and will be restored to their outward or unblocking position by operation of the cam 226 at the start of the next cycle of operation. If the key is released during any cycle, the lever 215 is released to the force of its spring 218 as soon as the cam enables arm 222 to lift away from the arcuate edge 220 of arm 215—the shape of the arm 215 preventing rocking of the arm until the arm 222 is lifted to disengage ear 221 from cam edge 220.

The release of the shift key 86 functions in a similar manner when the leftward movement of push rod 104, under the urgency of its spring 109 (Fig. 5), serves to rock shaft 178 counter-clockwise, restoring arms 233 and 238 (Fig. 8) to their normally inoperative position. With the restoration of arm 233, spring 252 (Fig. 7) restores bellcrank 251 to its active position, moving the nose of one arm thereof into position for engagement by the V-nose 254 of clutch-engaging bellcrank 137 to effect disengagement of clutch 112. Centralizing levers 159, 160 are rendered effective, upon release of key 86, in a manner similar to that described in connection with the release of key 85.

Means are provided for control by the carriage 25, upon reaching its rightmost, or leftmost, end position, to effect disengagement of either the right shift clutch 110 or the left shift clutch 112 even though shift key 85 or 86 is held depressed. Referring to Figs. 3, 4 and 6, an upwardly extending ear 258 is formed at right angles to the upper end of a lever 259 pivoted at 257 on transverse bracket 17 and is adapted for engagement by the left-hand carriage end frame 29 (right-hand in Fig. 3) when the carriage is moved to the next to the last right-end ordinal position, or left-end ordinal position, as viewed in Fig. 3. A link 260 is pivotally mounted at its one end on the lower end of lever 259, and at its other end is provided with an elongated slot 261 for reciprocatory movement of link 260 on a pin 262 on a depending bracket 263 secured to transverse bracket 17. A spring 264 serves to urge link 260 and therefore lever 259 to the inoperative position shown in Fig. 3. The slotted end of the link 260 is distended to provide a cam surface 265 operatively related to a roller 266 on an ear 267 formed at a right angle to one arm 268 of a bellcrank 269 (Figs. 3 and 4) pivotally mounted on shaft 63. Arm 268 of bellcrank 269 also carries a pin 270, normally maintained out of engagement with the free end of an arm 271 secured on a shaft 272. An arm 292 (Fig. 6), also secured on shaft 272, carries a lateral extension 293 overlying an ear 294 formed at a right angle to arm 184, which becomes operable upon depression of right shift key 85 to rock arm 271 into abutting relation with pin 270. A second arm 273 of bellcrank 269 carries a pin 274 engaging an arm 275 of a bellcrank 276 pivotally mounted at 277 on a depending bracket 278 secured on transverse bracket 18 of the machine. A pin 282 on the other arm of bellcrank 276 is engaged in an open end slot of one arm 283 of a bail 284 mounted for rocking movement on shaft 60. The other arm 285 of the bail 284 is extended forwardly of the machine and carries a pin 286 engaged in an elongated slot in one end of a lever 287 pivoted at 288 on a bracket 289 secured on transverse bracket 22. The other end of the lever 287 is provided with an ear 290 formed at right angles thereto and positioned to underlie a rearwardly extending finger 291 of pusher link 97.

As seen in Fig. 3, as the carriage 25 is shifted one ordinal position to the left, from the penultimate position shown, into the leftmost ordinal position thereof, lever 259 is rocked counter-clockwise to move link 260 to the right. Cam surface 265 then becomes effective to rock bellcrank 269 clockwise, as viewed in Fig. 4, which, through pin 270, imparts a counter-clockwise rotation to arm 271 and therefore shaft 272. Counter-clockwise rocking of shaft 272 (Fig. 6), is effective, through arm 292, ear 293, and lateral projection 294, to rock arm 184 counter-clockwise about its pivot 185. With the rocking of arm 184, spring 188 urges arm 190 clockwise, thereby removing one end of pin 189 from the rotational plane of the nose 192. Simultaneously, with the counter-clockwise rocking movement of shaft 272, pin 274 on arm 273 of bellcrank 269 serves to impart a clockwise rotation to bellcrank 276, which, through pin 282, bail 284 and lever 287, rocks pusher link 97 counter-clockwise to release the right shift push rod 103 for leftward movement under the urgency of its spring 109. Upon restoration of push rod 103 to its normally inactive position, spring 182 (Fig. 6), which has previously been tensioned, rocks arm 179 to the position shown, and spring 205 (Fig. 3) becomes effective to rock bellcrank 198 to its normal, clutch-disengaging, position to effect disengagement of clutch 110 in the full-cycle position thereof. With the restoration of the arm 179 to its inoperative position, the worm shaft 132 is immediately centralized, as described hereinbefore.

If left shift control key 86 is held depressed for an indefinite number of shift cycles of clutch 112 (Fig. 7), the movement of the carriage 25 to its leftmost end position, as viewed from the front of the machine, or the rightmost end position, as viewed in Fig. 3, operates to automatically disengage the clutch 112, thereby terminating the shifting operation. A bracket 295 is secured to the lower surface of the carriage frame 45 in the accumulator carriage 25 (Fig. 5) and is effective with the rightward shifting movement of the carriage (Fig. 3) into the next to the last ordinally shifted position thereof to engage an ear 296 formed at right angles to the upper end of a lever 297 pivoted at 298 for clockwise rocking movement on transverse bracket 17. The lower distended end of lever 297 is provided with a camming surface 299 for cooperation with a roller 300 mounted on a laterally extended portion of one arm 301 of a three-armed lever 302 pivotally mounted on shaft 63. A second arm 303 of three-armed lever 302 (Figs. 3 and 5) carries a pin 304 normally out of engagement with one arm 305 of a bail 306 rockably mounted on shaft 272. A link 307 is pivoted at its one end at 308 on the lower end of a third arm 309 of lever 302 and, at its other end, is pivoted at 310 to one arm 311 of a bail 312 rockably mounted on a transverse shaft 313. The other arm 314 of bail 312 is provided with a laterally extended ear 315 underlying a depending rearwardly extending finger 316 (Fig. 2) of pusher arm 98. Spring 100 normally serves to maintain roller 300 in engagement with the camming surface 299 of the lever 297.

Upon movement of the carriage into its extreme rightmost position, as viewed in Fig. 3, bracket 295 thereon imparts a clockwise angular rotation of lever 297 against the urgency of a spring 317, thereby rocking three-armed lever 302 in a clockwise direction (Fig. 5). An arm 320 of bail 306 integral with arm 305 (Figs. 3, 5 and 8) is provided at its free end with an ear 321 overlying a lateral extension 322 on L-shaped arm 238. Upon rocking of arm 238 with a depression of left shift key 86 to effect engagement of the clutch 112, bail 306 is rocked clockwise to move arm 305 (Fig. 5) into engagement with pin 304. Thus, clockwise rocking of three-armed lever 302 serves, through pin 304, and arms 305, 320, to rock arm 238 counter-clockwise against the urgency of spring 236 to move the operative end of pin 242 (Figs. 7 and 8) out of the rotational plane of the nose 323 of lever 136. Simultaneously therewith, rocking of lever 302 is effective, through link 307, and arms 311, 314 to raise pusher link 98 (Fig. 2) out of engagement with push rod 104 to enable its spring 109 to restore the rod to its normally inactive position. Arm 233 is urged, by tensioned spring 236, to its normal position, as shown in Fig. 8, when spring 252 (Fig. 7) becomes effective to restore bellcrank 251 to its clutch-disengaging position with respect to nose 254 of bellcrank 137 to terminate the shifting operation in the full-cycle position of the clutch 112. Centralizer disk 156 is effective to be blocked against rotation in the full-cycle position of the clutch 112 by levers 159, 160, as described supra.

I claim:

1. In a calculating machine having a cyclically operated mechanism and means for centralizing said mechanism, a cyclical driving means selectively operable to drive said cyclically operated mechanism, a source of power for said driving means, a clutch between said driving means and said cyclically operated mechanism including a member driven by said driving means, a driven means normally inoperative to control the operation of said mechanism, a lever mounted on said driven member for rotation therewith and operatively positionable relative to said driven means, an engaging means rotatable with said driven member and rockable from an inactive to an active position to operatively position said lever, a detent means resiliently operable to latch said engaging means in the inactive or active position thereof, a releasing means effective in timed relationship with the rotation of said driven member to disengage said lever from said driven means, a pin rockable into the rotational path of said engaging means operable to actively position said engaging means upon operation of said driving means, a cam driven in cyclic fashion by said driving means, a cam follower actuated by said cam, a pawl movable relative to said cam follower immediately operable upon operation of said driving means to disable said centralizing means, a manually operable control means for initiating operation of said driving means, and means actuated by said control means effective to rock said pin, to disable said releasing means, and to move said pawl relative to said cam follower.

2. In a calculating machine having a cyclically operated mechanism and a centralizing means therefor, a cyclic clutch means for driving said mechanism including a driving member and a driven member, power means for said driving member, means rotatable with said driving member movable to an active position to engage said driving member with said driven member, a normally inactive means mounted on said driving member for rotation therewith actively positionable to effect movement of said rotatable means, means operable to detent said rotatable means and said positionable means in either the inactive or active position thereof, disengaging means normally operable in the full-cycle position of said driving member and said driven member to effect restoration of said rotatable means and said positionable means from their active to their inactive position, a control key for initiating operation of said power means, a means normally ineffectively driven by said power means in cyclic fashion and in timed relationship with said driving member for disabling said centralizing means, means controlled by said control key operable to actively position said positionable means upon rotation of said driving member, and means operated by said key to disable said disengaging means, and to render said power-driven means effective to disable said centralizing means.

3. In a calculating machine having a cyclically operated mechanism, means for centralizing said mechanism in the full-cycle position thereof, a clutch means including a driving member and a driven member for controlling the cyclic operation of said mechanism, a power means for said driving member, engaging means normally ineffectively rotatable with said driving member operable to connect said driving member with said driven member, means positionable to render said engaging means effective upon rotation of said driving member, cyclic means driven by said power means in timed relationship with said driving member normally ineffective to control the operation of said centralizing means, clutch disengaging means adjustable from an active position to enable the operation of said engaging means, and a control key operable to initiate operation of said power means, to actively position said positionable means, to adjust said clutch disengaging means, and to render said cyclic means effective to disable said centralizing means.

4. In a calculating machine having a bi-cyclically operable mechanism, means for centralizing said mechanism in a full-cycle position thereof, a clutch means including a cyclic driving member and a driven member for controlling the operation of said mechanism, a power means for said driving member, a normally inactively positioned means mounted on said driving member for rotation therewith, an adjustable means rotatable with said driving member and operable upon adjustment thereof to actively position said normally inactive means thereby connecting said driving member with said driven member, a detent means operable to resiliently maintain said adjustable means in each adjusted position thereof, means positionable to control the effective adjustment of said adjustable means as a result of the rotation of said driving member, a cam means cyclically driven by said power means in timed relationship with said driving member, a cam follower means rockable by said cam means with each rotation of said driving member, actuated means actively positionable relative to said cam follower means and operable upon rotation of said cam to render said centralizing means ineffective, manually operable means for initiating operation of said power means, and control means effective upon operation of said manually operable means to position said positionable means and to actively position said actuated means.

5. In a calculating machine having a bi-cyclically operable mechanism, means for centralizing said mechanism in a full-cycle position thereof, a clutch means including a cyclic driving means and a driven member for controlling the bi-cyclic operation of said mechanism, said driving means including a member rockable into active position relative to said driven member and a two-position member adjustable from an inactive position to rock said rockable member, resilient means rotatable with said driving means for latching said adjustable member in either position, a power means for said driving means, means movable into the rotational path of said adjustable member operable upon rotation of said driving means to actively position said adjustable member, means driven in cyclic relation to said driving means normally ineffective to disable said centralizing means, means associated with said centralizing means movable into cooperative relationship with said cyclic driven means to disable said centralizing means, spring means normally urging said associated means to inoperative position, means for moving said associated means to operative position, a control key for initiating operation of said power means, means operated by said control key for controlling the operation of said movable means and said moving means, and a clutch-disengaging means disabled by said key-operated means and operable upon release of said key to restore said rockable member and said adjustable member to their inactive positions.

6. In a calculating machine having a shiftable register, a keyboard, means for ordinally shifting said register in either direction relative to said keyboard, a source of power, means for centralizing said shifting means in each ordinally shifted position of said register, a pair of control keys for selectively determining the operation of said shifting means and initiating operation of said power source, means for disabling said centralizing means, a controlled means for each of said keys respectively operable thereby to control the operation of said disabling means, and selectively operable means for controlling the operation of said shifting means the combination comprising, a first cyclically operable clutch and a second cyclically operable clutch between said source of power and said shifting means, each of said clutches including a driving member and a driven member, means mounted on each of said driving members normally disengaged from the corresponding driven member, an adjustable means associated with each of said mounted means and carried by each of said driving members for selective adjustment from an inactive to an active position to engage the associated mounted means with the corresponding driven member, a latch means for each of said adjustable means resiliently operable to maintain the associated adjustable means and mounted means in the inactive or active position thereof, and a member for each of said clutches selectively operable by the said selected key controlled means for movement into the path of rotation of the corresponding one of said adjustable means to effect engagement of the associated mounted means.

7. In a calculating machine having a keyboard, a shiftable register, means for ordinally shifting said register in either direction relative to said keyboard, means for centralizing said shifting means in each ordinally shifted position of said register, a right shift key and a left shift key, a pair of clutches respectively selectively operable upon engagement to determine the direction of shifting movement of said register, each of said clutches including a driving member and a driven member, a source of power for said driving members rendered operable upon depression of either of said keys, a first clutch engaging means and a second clutch engaging means respectively operable to effect the engagement of the corresponding clutch, a control means associated with each of said engaging means respectively positionable by a selected key to control the operation of said engaging means upon rotation of said driving member, means for disabling said centralizing means upon rotation of said driving members, means operative by either of said control means to enable the operable of said disabling means, a disengaging means for each of said clutches normally operatively positioned relative thereto, each rendered ineffective by the corresponding control means in response to the key depressed, a link operable upon movement thereof to disable the control means operated by said right shift key to thereby enable the operation of said disengaging means and to render said enabling means ineffective, means operated by said register upon reaching the extreme right position thereof to control the movement of said link, a camming means operated by said register upon reaching the extreme left-end position thereof, and means operated by said camming means for disabling the control means operated by said left shift key to thereby enable operation of the corresponding disengaging means and to render said enabling means ineffective.

8. In a calculating machine having an ordinally shiftable carriage, a cyclically operable drive means, a rotary carriage shifting mechanism operable to shift said carriage selectively in either direction from one ordinal position to another, means for centralizing said carriage shifting mechanism in selected ordinal positions of said carriage, a pair of manually operable means for controlling the operation of said shifting mechanism, and a left shift clutch and a right shift clutch for operating said rotary shifting mechanism, each of said clutches comprising a drive member connected to said drive means, a driven member to control the operation of said rotary shifting mechanism, a normally inactive interponent on each of said drive members positionable to effect the connection between the corresponding driven member and said drive member, a latching means for each of said interponents respectively operable to resiliently maintain said interponents in the inactive or connecting position thereof, means associated with each of said manually operable means respectively conditioned thereby for control by said drive means to position the interponent of the corresponding clutch in connecting position, and means rendered operable by either of said control means for actuation by said drive means to disable said centralizing means.

References Cited in the file of this patent

UNITED STATES PATENTS

| | | |
|---|---|---|
| 987,509 | Thoellden | Mar. 21, 1911 |
| 2,271,240 | Avery | Jan. 27, 1942 |
| 2,419,760 | Britten | Apr. 29, 1947 |
| 2,636,678 | Matthew | Apr. 28, 1953 |
| 2,644,639 | Hawthorne | July 7, 1953 |